United States Patent
Du et al.

(10) Patent No.: US 12,095,679 B2
(45) Date of Patent: Sep. 17, 2024

(54) USER EQUIPMENT AND METHOD FOR MANAGING OUT-OF-ORDER PACKETS

(71) Applicant: MediaTek Singapore Pte. Ltd., Singapore (SG)

(72) Inventors: Cunliang Du, Beijing (CN); Zhuoliang Zhang, Beijing (CN); Yi-Ting Cheng, Hsinchu (TW); Na Wang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 256 days.

(21) Appl. No.: 17/515,889

(22) Filed: Nov. 1, 2021

(65) Prior Publication Data
US 2023/0073796 A1 Mar. 9, 2023

(30) Foreign Application Priority Data
Sep. 8, 2021 (CN) .......................... 202111051955.6

(51) Int. Cl.
*H04L 49/90* (2022.01)
*H04L 43/028* (2022.01)
(Continued)

(52) U.S. Cl.
CPC ............ *H04L 49/90* (2013.01); *H04L 43/028* (2013.01); *H04L 47/28* (2013.01); *H04L 47/34* (2013.01); *H04L 69/161* (2013.01)

(58) Field of Classification Search
USPC ........................................................ 370/252
See application file for complete search history.

(56) References Cited

U.S. PATENT DOCUMENTS 10,027,593 B2 7/2018 Zhang et al.
10,397,754 B2 8/2019 Vajapeyam et al.
(Continued)

FOREIGN PATENT DOCUMENTS

CN 106063324 A 10/2016
CN 107852768 A 3/2018

OTHER PUBLICATIONS

Chinese language office action dated Apr. 25, 2022, issued in application No. TW 110142329.

*Primary Examiner* — Gary Mui
*Assistant Examiner* — Hooman Houshmand
(74) *Attorney, Agent, or Firm* — McClure, Qualey & Rodack, LLP (57) ABSTRACT

User equipment (UE) for managing out-of-order packets is provided. The UE may include a radio frequency (RF) signal processing device, a management module, a filter module and a multi-reorder queue circuit. The RF signal processing device may receive a plurality of packets from a network node. The management module may collect network information of the network node and application information and generate a plurality of filter rules according to the network information and the application information. The filter module may receive the filter rules from the management module and allocate a plurality of out-of-order packets of the packets to different reorder queues according to the filter rules, wherein each reorder queue corresponds to a different reorder timer. The multi-reorder queue circuit includes the reorder queues. The multi-reorder queue circuit determines how to push each out-of-order packet to its corresponding application through a TCP/IP stack.

20 Claims, 5 Drawing Sheets

(51) Int. Cl.
*H04L 47/28* (2022.01)
*H04L 47/34* (2022.01)
*H04L 69/16* (2022.01)

(56) References Cited

U.S. PATENT DOCUMENTS

| | | | |
|---|---|---|---|
| 11,387,945 B1* | 7/2022 | Bathwal | H04L 1/1835 |
| 2012/0155438 A1* | 6/2012 | Shin | H04L 1/1841 |
| | | | 370/336 |
| 2014/0301188 A1* | 10/2014 | Koskinen | H04L 47/32 |
| | | | 370/230 |
| 2016/0315868 A1* | 10/2016 | Zhang | H04L 47/624 |
| 2017/0171060 A1* | 6/2017 | Liu | H04L 67/60 |
| 2020/0403928 A1* | 12/2020 | Amend | H04L 47/624 |
| 2021/0400537 A1* | 12/2021 | Zhang | H04L 47/28 |
| 2022/0209903 A1* | 6/2022 | Zhang | H04L 1/1835 |

* cited by examiner

USER EQUIPMENT AND METHOD FOR MANAGING OUT-OF-ORDER PACKETS

CROSS REFERENCE TO RELATED APPLICATIONS

This Application claims priority of CN Patent Application No. 202111051955.6, filed on Sep. 8, 2021, the entirety of which is incorporated by reference herein.

BACKGROUND OF THE INVENTION

Field of the Invention

The invention generally relates to a wireless communication technology, and more particularly, to an out-of-order packets managing technology.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In the 5G NR, the packets will be pushed to the Packet Data Convergence Protocol (PDCP) layer as long as the Radio Link Control (RLC) layer reassembles a complete RLC SDU. Therefore, the RLC Service Data Units (SDUs) appearing in PDCP layer may be out of order. Therefore, a reorder timer is introduced into the PDCP layer to make these out-of-order packets in order. However, the packets pushed to the PDCP layer do not carry any application information. Therefore, even if an application has lower requirement for the order of packets, the packets for this application can be pushed to the application layer in PDCP layer only when all packets are in order or the reorder timer is expired. This mechanism may cause harm to some latency-sensitive applications (e.g. games). On the other hand, if the reorder timer is turned off, the order-sensitive applications (e.g. FTP files) will get poor performance.

BRIEF SUMMARY OF THE INVENTION

User equipment (UE) and method for managing out-of-order packets are provided to overcome the problems mentioned above.

An embodiment of the invention provides user equipment (UE) for managing out-of-order packets. The UE may comprise a radio frequency (RF) signal processing device, a management module, a filter module and a multi-reorder queue circuit. The RF signal processing device may receive a plurality of packets from a network node. The management module may collect network information of the network node and application information and generate a plurality of filter rules according to the network information and the application information. The filter module may receive the filter rules from the management module and allocate a plurality of out-of-order packets to different reorder queues according to the filter rules, wherein each reorder queue corresponds to a different reorder timer. The multi-reorder queue circuit comprises the reorder queues. The multi-reorder queue circuit determines how to push each out-of-order packet to its corresponding application through a TCP/IP stack.

In some embodiments of the invention, the network information comprises operator information, a network type, signal strength, latency, an out-or-order rate and a packet loss rate and so on.

In some embodiments of the invention, the application information comprises types of applications, 5-tuple information of applications, and process ID of applications and so on.

In some embodiments of the invention, the management module comprises a recorder, a collector and a reorder timer setting module. The recorder may record an application list, types of applications in the application list and default reorder timers corresponding to applications in the application list. The collector collects the network information and the application information, wherein the collector collects the application information corresponding to the applications in the application list. The reorder timer setting module receives the network information and the application information from the collector, receives the default reorder timers from the recorder, and generates the filter rules according to the network information, the application information and the default reorder timers, wherein the filter rules comprise the expiration value of the reorder timers of the reorder queues. In some embodiments of the invention, the reorder timer setting module updates the filter rules according to new network information and new application information collected by the collector.

In some embodiments of the invention, the filter module comprises a storage device and a checker. The storage device stores a multi-reorder queue table, wherein the multi-reorder queue table is established based on the filter rules from the management module. The checker allocates the out-of-order packets to different reorder queues according to the multi-reorder queue table. In some embodiments of the invention, the packets are classified into three types. In some embodiments of the invention, for one type, if the packets are in order, the checker directly pushes the packets to its corresponding application through the stack. In some embodiments of the invention, for another two types, if a first out-of-order packet of the out-of-order packets matches with one filter rule in the multi-reorder queue table, the checker allocates the first out-of-order packet to its corresponding reorder queue of the multi-reorder queue circuit, and if a second out-of-order packet of the out-of-order packets does not match with any filter rule in the multi-reorder queue table, the checker allocates the second out-of-order packet to a normal queue of the multi-reorder queue circuit.

In some embodiments of the invention, before a reorder timer corresponding to one reorder queue of the multi-reorder queue circuit is not expired, if a bitmap is complete, the multi-reorder queue circuit pushes the packets in the reorder queue to its corresponding application through the TCP/IP stack, wherein the bitmap may be used for determining whether the lost packets of the packets in the queue have been waited.

In some embodiments of the invention, when a reorder timer corresponding to one reorder queue of the multi-reorder queue circuit is expired and a bitmap is not complete, the multi-reorder queue circuit pushes the packets in the reorder queue to the TCP/IP stack.

In some embodiments of the invention, the multi-reorder queue circuit checks high level sequence numbers of the out-of-order packets, wherein the high level sequence numbers are supported by a higher layer protocol, such as TCP.

In some embodiments of the invention, if the high level sequence numbers of the out-of-order packets are continuous, the multi-reorder queue circuit pushes the out-of-order packets to its corresponding application through the TCP/IP stack.

An embodiment of the invention provides a method for managing out-of-order packets. The method is applied to a user equipment (UE). The method comprises the following steps: a radio frequency (RF) signal processing device of the UE receives a plurality of packets from a network node; a management module of the UE collects network information of the network node and application information; the management module of the UE generates a plurality of filter rules according to the network information and the application information; a filter module of the UE receives the filter rules from the management module; the filter module of the UE allocates a plurality of out-of-order packets of the packets to different reorder queues of a multi-reorder queue circuit of the UE according to the filter rules, wherein each reorder queue corresponds to a different reorder timer; and the multi-reorder queue circuit determines how to push each out-of-order packet to its corresponding application through a TCP/IP stack.

Other aspects and features of the invention will become apparent to those with ordinary skill in the art upon review of the following descriptions of specific embodiments of the UE and method for managing out-of-order packets.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
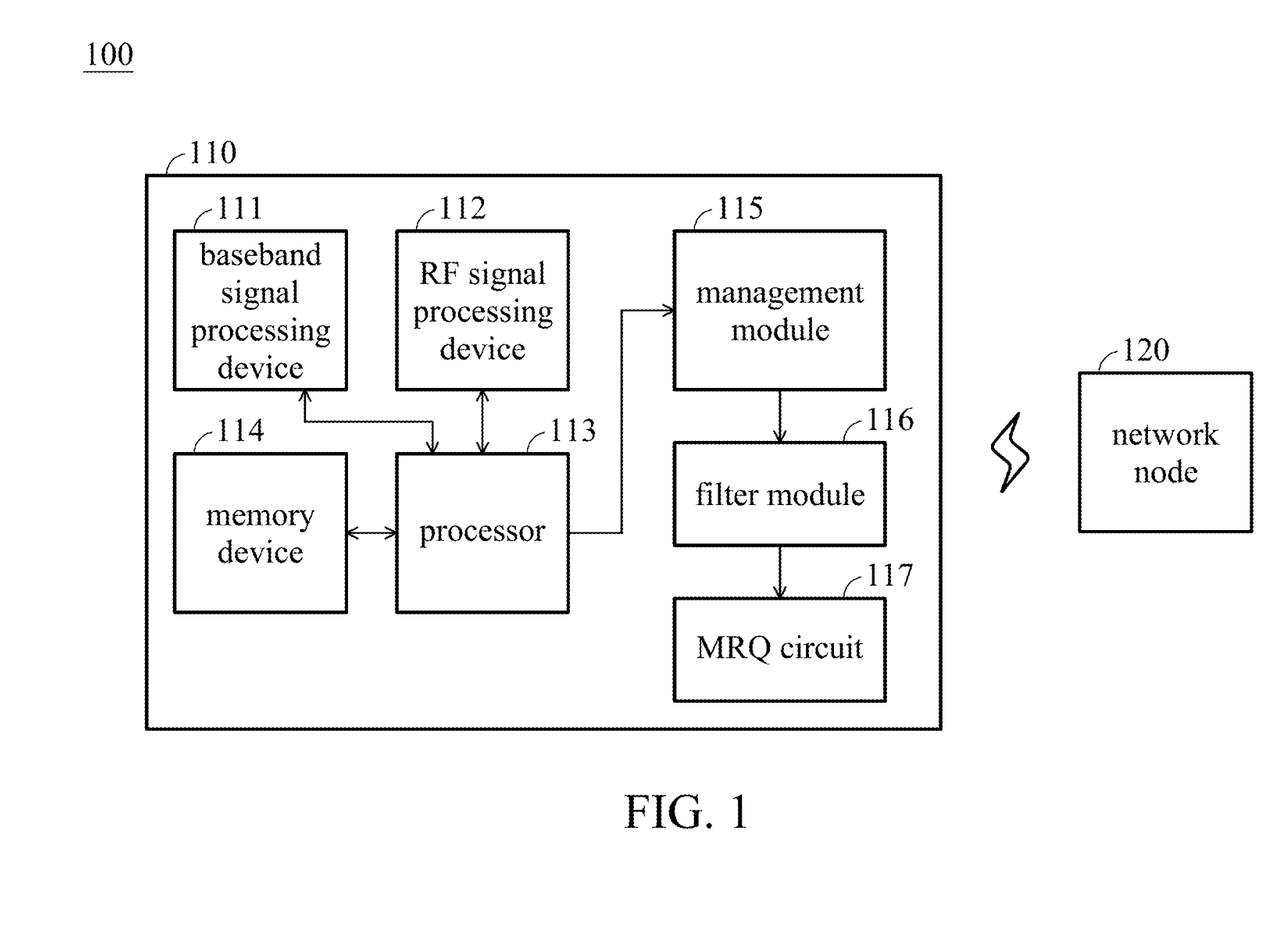
FIG. 1 is a block diagram of a wireless communications system according to an embodiment of the invention.

FIG. 1 is a block diagram of a wireless communications system 100 according to an embodiment of the invention. As shown in FIG. 1, the wireless communications system 100 may comprise user equipment (UE) 110 and a network node 120. It should be noted that in order to clarify the concept of the invention, FIG. 1 presents a simplified block diagram in which only the elements relevant to the invention are shown. However, the invention should not be limited to what is shown in FIG. 1.

In the embodiments, the network node 120 may be a base station, a gNodeB (gNB), a NodeB (NB) an eNodeB (eNB), an access point, an access terminal, but the invention should not be limited thereto. In the embodiments, the UE 110 may communicate with the network node 120 through the fifth generation (5G) communication technology or 5G New Radio (NR) communication technology, but the invention should not be limited thereto.

As shown in FIG. 1, the UE 110 may comprise at least a baseband signal processing device 111, a radio frequency (RF) signal processing device 112, a processor 113, a memory device 114, a management module 115, a filter module 116, a multi-reorder queue (MRQ) circuit 117 and an antenna module comprising at least one antenna.

In the embodiments of the invention, the UE 110 may be a smartphone, Personal Data Assistant (PDA), pager, laptop computer, desktop computer, wireless handset, or any computing device that includes a wireless communications interface.

The RF signal processing device 112 may receive RF signals via the antenna and process the received RF signals to convert the received RF signals to baseband signals to be processed by the baseband signal processing device 111, or receive baseband signals from the baseband signal processing device 211 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, analog-to-digital converter (ADC)/digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 1.

According to an embodiment of the invention, the baseband signal processing device 111 and the RF signal processing device 112 may be configured in a modem of the UE 110, and the processor 113 may be configured in an application processor (AP) of the UE 110. According to an embodiment of the invention, the management module 115, the filter module 116 and the MRQ circuit 117 may be configured in the modem. According to another embodiment of the invention, the management module 115, the filter module 116 and the MRQ circuit 117 may be configured in the application processor. In an embodiment of the invention, the management module 115 may be configured in the application processor and the filter module 116 and the MRQ circuit 117 may be configured in the modem. According to the embodiments of the invention, the application processor may further comprise a network interface card (NIC) driver and a TCP/IP stack 118.

In addition, according to an embodiment of the invention, the management module 115, the filter module 116 and the MRQ circuit 117 may be software modules executed by the modem or the application processor. According to another embodiment of the invention, the management module 115, the filter module 116 and the MRQ circuit 117 may be hardware (e.g. circuits) configured in the modem or the application processor.

Figure 2:
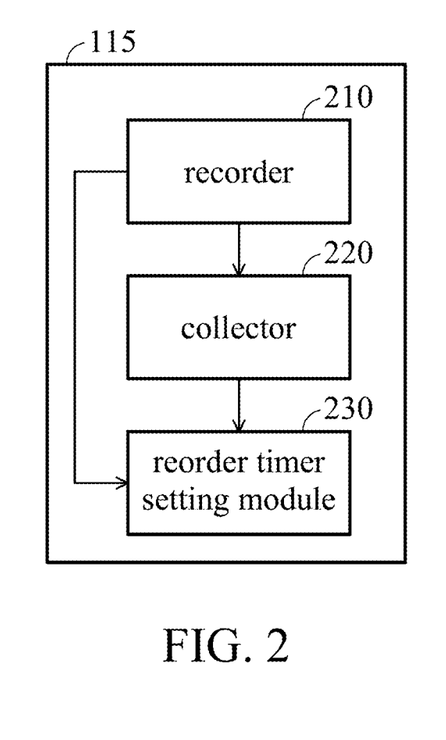
FIG. 2 is a block diagram of a management module according to an embodiment of the invention.

According to the embodiments of the invention, the management module 115 may be configured to collect the network information of the network node 120 and application information and generate a plurality of filter rules according to the network information and the application information. FIG. 2 is a block diagram of a management module according to an embodiment of the invention. As shown in FIG. 2, the management module 115 may comprise a recorder 210, a collector 220 and a reorder timer setting module 230.

The recorder 210 may record an application list, types of applications in the application list and default reorder timers corresponding to applications in the application list. The application list may record the applications currently operated. The types of applications may comprise a latency-sensitive type or an order-sensitive type, but the invention should not be limited thereto. The values of the default reorder timers may be historical timer setting values of the applications.

The collector 220 may collect the network information of the network node 120. In addition, the collector 220 may collect the application information corresponding to the applications in the application list. According to an embodiment of the invention, the network information may comprise an operator information (i.e. the network operator providing service to the UE 110), a network type (e.g. 4G or 5G, but the invention should not be limited thereto), a signal strength of the current network, a latency of the current network, an out-or-order rate of the current network and packet loss rate of the current network, but the invention should not be limited thereto. According to an embodiment of the invention, the application information may comprise the types of applications (e.g. latency-sensitive type or order-sensitive type), the 5-tuple information (i.e. source IP address, destination IP address, source port number, destination port number and protocol in use) of applications, and process ID of applications, but the invention should not be limited thereto.

The reorder timer setting module 230 may receive the network information and the application information from the collector 220. In addition, the reorder timer setting module 230 may receive the default reorder timers from the recorder 210. According to the embodiments of the invention, the reorder timer setting module 230 may generate the filter rules according to the default reorder timers, or according to the network information, the application information and the default reorder timers. Then, the reorder timer setting module 230 may transmit the filter rules to the filter module 116.

According to an embodiment of the invention, in an initial state or an operator switching state, the reorder timer setting module 230 may generate the filter rules according to the default reorder timers from the recorder 210.

According to another embodiment of the invention, in normal state, the reorder timer setting module 230 may generate the filter rules according to the network information, the application information and the default reorder timers. In the embodiment, the information (i.e. the network information and the application information) collected by the collector 220 and the default reorder timers from the recorder 210 may correspond to different weights. When the reorder timer setting module 230 determines values of the reorder timers in the filter rules, the reorder timer setting module 230 may multiply the information collected by the collector 220 by its corresponding weight and multiply the default reorder timers from the recorder 210 by its corresponding weight.

According to an embodiment of the invention, each filter rule may comprise its corresponding application, its corresponding 5-tuple information (i.e. source IP address, destination IP address, source port number, destination port number and protocol in use) of its corresponding application, its corresponding type of service (ToS) information, its corresponding differentiated services code point (DSCP) information, its corresponding reorder queue ID, its corresponding reorder timer value, and its corresponding priority, but the invention should not be limited thereto.

According to an embodiment of the invention, the reorder timer setting module 230 may update the filter rules according to new network information and new application information collected by the collector 220. Then, the reorder timer setting module 230 may transmit the updated filter rules to the filter module 116.

According to an embodiment of the invention, the reorder timer setting module 230 may analyze a current network quality based on the current network information from the collector 220. When the network quality becomes worse, the reorder timer setting module 230 may adjust the reorder timer values, e.g. the reorder timer setting module 230 may increase the reorder timer value corresponding to the application with the latency-sensitive type; and when the network quality becomes better, the reorder timer setting module 230 may also adjust the reorder timer values, e.g. the reorder timer setting module 230 may reduce the reorder timer value corresponding to the application with the latency-sensitive type. In an embodiment, when the reorder timer setting module 230 adjusts the reorder timer values based on the current network quality, the reorder timer setting module 230 may refer to a lookup table to find a reorder timer value (such as, the golden value of reorder timer) based on the current network quality. In another embodiment, when the reorder timer setting module 230 adjusts the reorder timer values based on the current network quality, the reorder timer setting module 230 may use a smart learning algorithm (e.g. a neural network algorithm or model) to find a reorder timer value (such as, the golden value of reorder timer) based on the current network quality.

Figure 3:
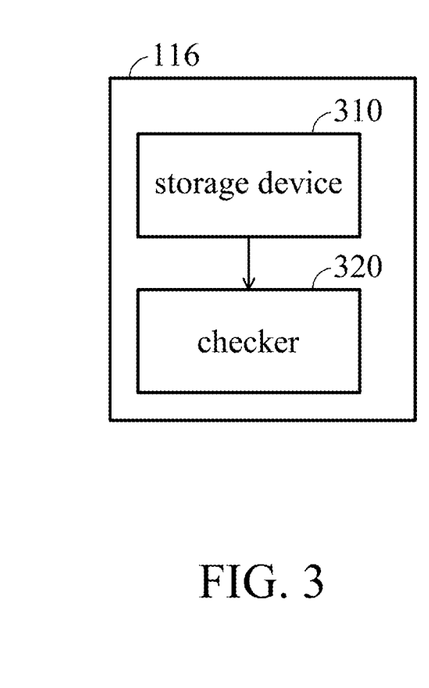
FIG. 3 is a block diagram of a filter module according to an embodiment of the invention.

According to the embodiments of the invention, the RF signal processing device 112 may receive a plurality of packets from the network node 120. The filter module 116 may receive the filter rules from the management module 115 and receive the packets in the RLC(Radio Link Control) SDU (Service Data Unit) from the RLC layer. The filter module 116 may allocate the out-of-order packets of the packets from the RLC layer to different reorder queues of the MRQ circuit 117 according to the filter rules. Each reorder queue of the MRQ circuit 117 may correspond to a different filter rule (i.e. correspond to a different reorder timer). FIG. 3 is a block diagram of a filter module according to an embodiment of the invention. As shown in FIG. 3, the filter module 116 may comprise a storage device 310 and a checker 320. According to an embodiment of the invention, the filter module 116 may be configured near the TCP/IP stack and the MRQ circuit, such as, in a network interface card (NIC) driver.

According to an embodiment of the invention, the storage device may store a multi-reorder queue (MRQ) table. The MRQ table is established based on the filter rules from the management module 115. When the filter rules are updated, the MRQ table may be updated according to the updated filter rules. If the number of updated filter rules is over a threshold, the filter rule with lower priority may be moved to a normal queue of MRQ circuit 117.

The checker 320 may allocate the out-of-order packets of the packets to different reorder queues of the MRQ circuit 117 according to the information of the multi-reorder queue table. According to an embodiment of the invention, if the packets are in order (i.e. continuous packets), the checker 320 may directly push the packets to its corresponding application through the TCP/IP stack 118. According to an embodiment of the invention, if an out-of-order packet of the out-of-order packets can match with one filter rule in the multi-reorder queue table, the checker 320 may allocates this out-of-order packet to its corresponding reorder queue of the MRQ circuit 117. In addition, if an out-of-order packet of the out-of-order packets does not match with any filter rule in the multi-reorder queue table, the checker 320 may allocate this out-of-order packet to a normal queue of the MRQ circuit 117.

According to the embodiments of the invention, the MRQ circuit 117 may comprise a normal queue and a plurality of reorder queues. The MRQ circuit 117 may determine how to push each out-of-order packet to its corresponding application through the TCP/IP stack 118. Details are illustrated below via FIGS. 4A and 4B.

Figure 4A:
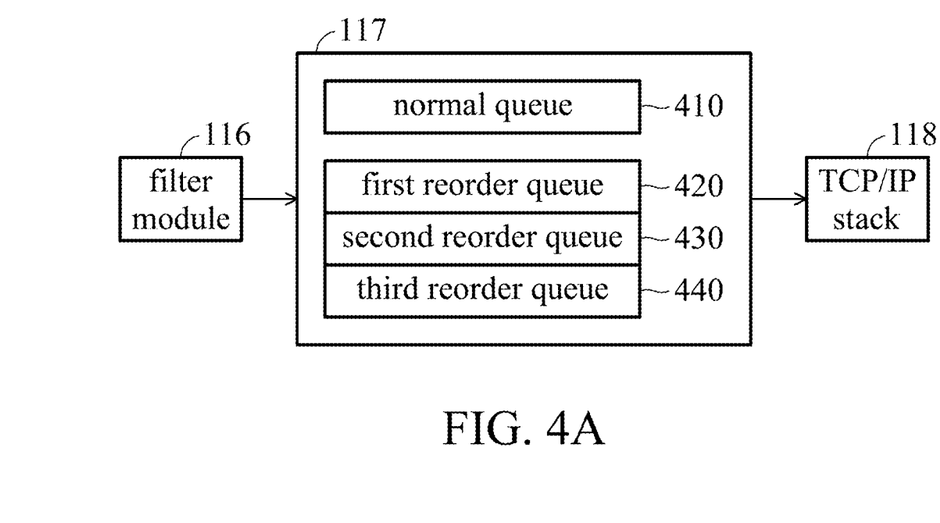
FIG. 4A is a block diagram of a multi-reorder queue (MRQ) circuit according to an embodiment of the invention.

FIG. 4A is a block diagram of a multi-reorder queue (MRQ) circuit according to an embodiment of the invention. As shown in FIG. 4A, the MRQ circuit 117 may comprise a normal queue 410 and reorder queues 420-440, but the invention should not be limited thereto. The normal queue 410 and reorder queues 420-440 may have its corresponding reorder timer. According to an embodiment, each queue (e.g. normal queue 410 and reorder queues 420-440) may push its out-of-order packets to the TCP/IP stack 118 after its reorder timer has been expired.

Figure 4B:
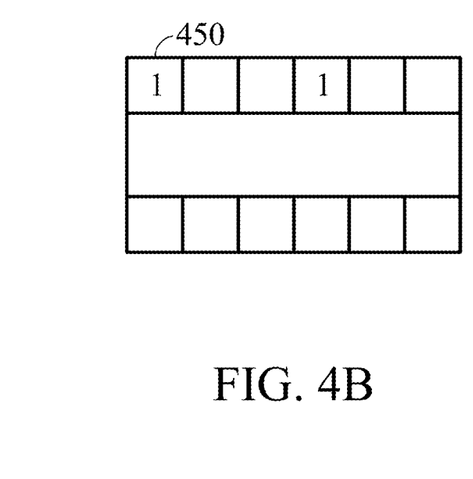
FIG. 4B is a schematic diagram of a bitmap according to an embodiment of the invention.

According to an embodiment, the MRQ circuit 117 may comprise a bitmap (as the bitmap 450 shown in FIG. 4B, but the invention should not be limited thereto). The bitmap may record the packets sent to the MRQ circuit 117. FIG. 4B is a schematic diagram of a bitmap according to an embodiment of the invention. As shown in FIG. 4B, when the MRQ circuit 117 receives the packet 1 and packet 4 from the filter module 116, the fields corresponding to the packet 1 and packet 4 in the bitmap 450 may be set to "1", but the invention should not be limited thereto.

According to an embodiment, before a reorder timer corresponding to one reorder queue (e.g. reorder queues 420-440) of the MRQ circuit 117 has not been expired, if a bitmap is complete (e.g. all fields of bitmap 450 have been set to "1", or part of the continuous fields at the front have been set to "1", but the invention should not be limited thereto), the MRQ circuit 117 may push the out-of-order packets in the reorder queue to its corresponding application through the TCP/IP stack 118, wherein the complete bitmap may include all or part of continuous fields of the bitmap.

According to an embodiment, when a reorder timer corresponding to one reorder queue (e.g. reorder queues 420~440) of the MRQ circuit 117 has been expired and a bitmap is still not complete (e.g. some fields of bitmap 450 have not been set to "1", but the invention should not be limited thereto), the MRQ circuit 117 may push the out-of-order packets in the reorder queue to the TCP/IP stack 118. In the embodiment, the packets pushed to the TCP/IP stack 118 may be allocated to applications through the higher layer protocol.

According to an embodiment, the MRQ circuit 117 may check high level sequence numbers of the out-of-order packets, wherein the high level sequence numbers are supported by a higher layer protocol (e.g. layer 4 protocol). If the high level sequence number of an out-of-order packet is continuous with the prior packet, the MRQ circuit 117 may directly push these out-of-order packets to its corresponding application through the TCP/IP stack 118 without waiting the expiration of the reorder timer.

Figure 5:
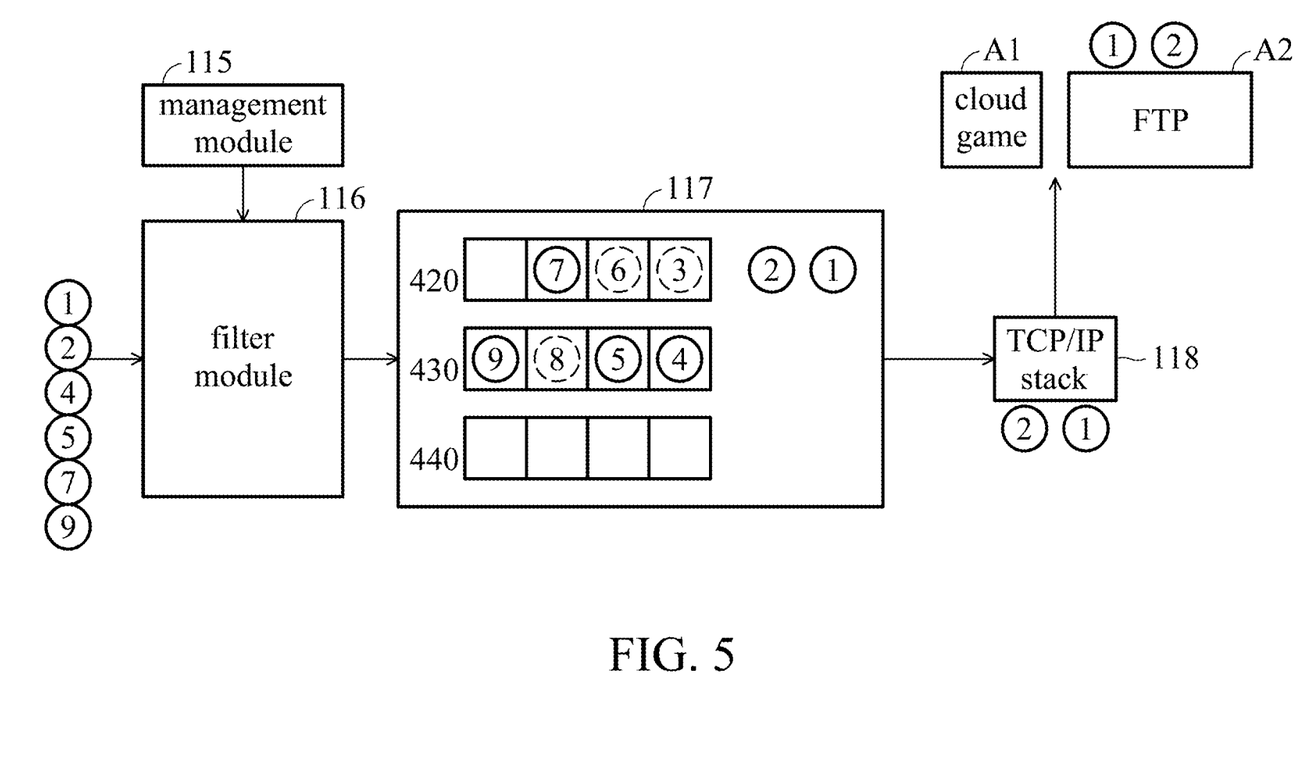
FIG. 5 is a schematic diagram of managing out-of-order packets according to an embodiment of the invention.

FIG. 5 is a schematic diagram of managing out-of-order packets according to an embodiment of the invention. As shown in FIG. 5, the filter module 116 may receive the packets 1, 2, 4, 5, 7 and 9, wherein the dashed circle means that the loss packet (i.e. the packet 3, 6 and 8 are lost). Therefore, the filter module 116 cannot know the packet 3, 6 and 8 belong to which application. In addition, it is assumed that the reorder queue 420 corresponds a first filter rule and has a first reorder timer (e.g. 180 millisecond (ms)), and the reorder queue 430 corresponds a second filter rule and has a second reorder timer (e.g. 15 ms). In addition, as shown in FIG. 5, application A1 (cloud game) and application A2 (FTP file) are operated in the UE 110. The application A1 (cloud game) is a latency-sensitive application and it corresponds to the reorder queue 430 with shorter reorder timer. The application A2 (FTP file) file is order-sensitive application and it corresponds to the reorder queue 420 with longer reorder timer. Because the packets 1 and 2 are in order, the filter module 116 may directly push the packets to its corresponding application (i.e. application A2) through the TCP/IP stack 118. Furthermore, the filter module 116 may allocate the out-of-order packets 4, 5, 7 and 9 to its corresponding reorder queue of the MRQ 117 according to the filter rules. In an embodiment, after the second reorder timer (e.g. 15 ms) has been expired, if the packet 3 still not been received, the MRQ circuit 117 may push the out-of-order packets 4 and 5 to TCP/IP stack 118. Then, the TCP/IP stack 118 may allocate the out-of-order packets 4 and 5 through higher layer protocol. In another embodiment, if the high level sequence number (such as, the L4 sequence number, also referred as TCP SN) of the out-of-order packet 4 is continuous with the prior packet of application A1, the MRQ circuit 117 may directly push the out-of-order packets 4 and 5 to its corresponding application through the TCP/IP stack 118 without waiting the expiration of the second reorder timer. It should be noted that FIG. 5 is only used to illustrate the embodiments of the invention, but the invention should be limited thereto.

Figure 6:
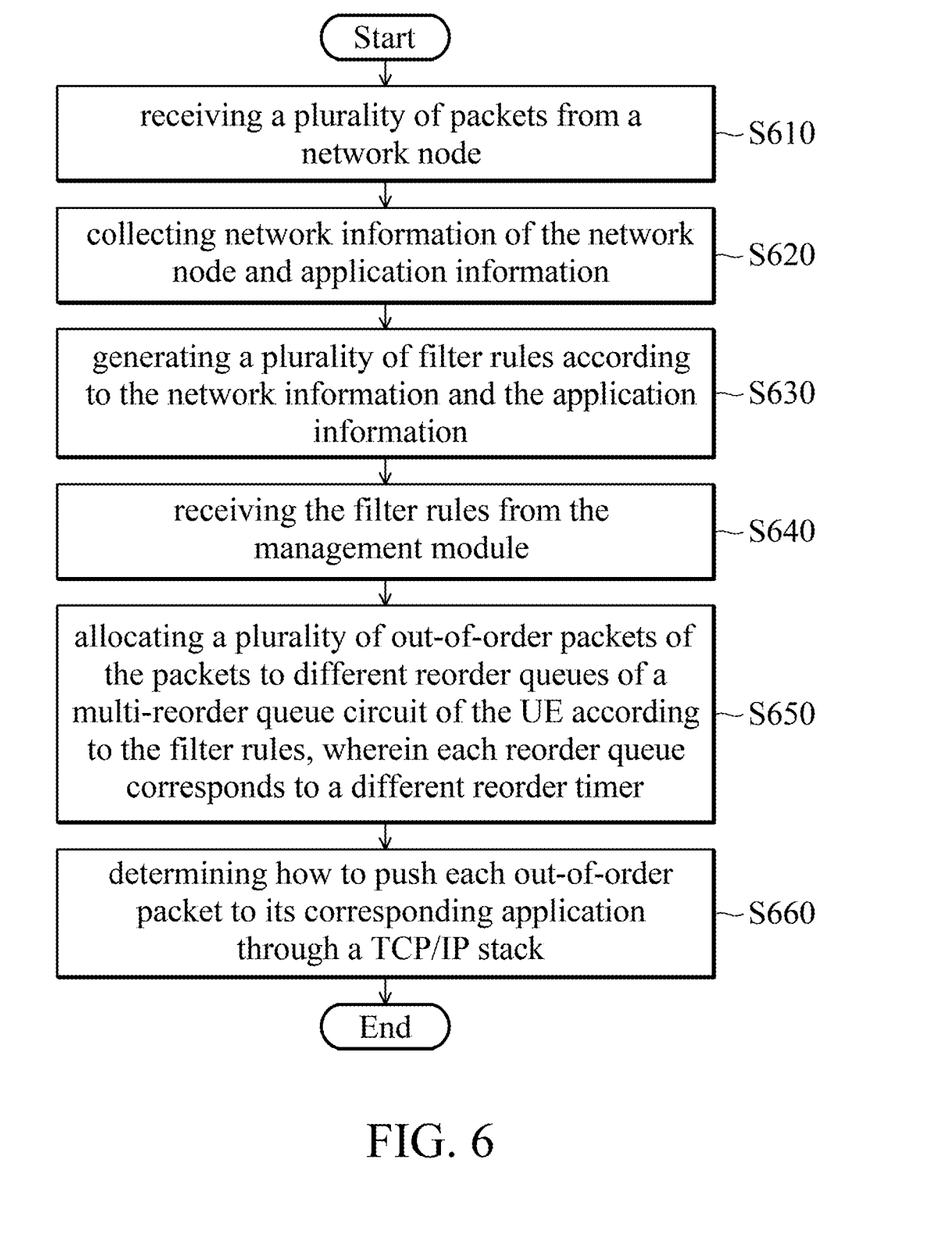
FIG. 6 is a flow chart illustrating a method for managing out-of-order packets according to an embodiment of the invention.

FIG. 6 is a flow chart illustrating a method for managing out-of-order packets according to an embodiment of the invention. The method for managing out-of-order packets can be applied to the communication system 100 which comprises the UE 110 and the network node 120. As shown in FIG. 6, in step S610, a radio frequency (RF) signal processing device of the UE 110 receives a plurality of packets from a network node 120.

In step S620, a management module of the UE 110 collects network information of the network node and application information.

In step S630, the management module of the UE 110 generates a plurality of filter rules according to the network information and the application information.

In step S640, a filter module of the UE 110 receives the filter rules from the management module of the UE 110.

In step S650, the filter module of the UE 110 allocates a plurality of out-of-order packets of the packets to different reorder queues of a multi-reorder queue circuit of the UE 110 according to the filter rules, wherein each reorder queue corresponds to a different reorder timer.

In step S660, the multi-reorder queue circuit of the UE 110 determines how to push each out-of-order packet to its corresponding application through a TCP/IP stack.

In some embodiments of the invention, in the method for managing out-of-order packets, the network information comprises operator information, a network type, signal strength, latency, an out-or-order rate and a packet loss rate and so on.

In some embodiments of the invention, in the method for managing out-of-order packets, the application information comprises types of applications, 5-tuple information of applications, and process ID of applications and so on.

In some embodiments of the invention, in the method for managing out-of-order packets, the management module may comprise a recorder, a collector and a reorder timer setting module. The recorder may record an application list, types of applications in the application list and default reorder timers corresponding to applications in the application list. In step S620, the collector collects the network information and the application information, wherein the collector collects the application information corresponding to the applications in the application list. In step S630, the reorder timer setting module receives the network information and the application information from the collector, receives the default reorder timers from the recorder, and generates the filter rules according to the network information, the application information and the default reorder timers. The filter rules comprise the expiration value of the reorder timers of the reorder queues. In some embodiments of the invention, in the method, the reorder timer setting module updates the filter rules according to new network information and new application information collected by the collector.

In some embodiments of the invention, in the method for managing out-of-order packets, the filter module comprises a storage device and a checker. The storage device stores a multi-reorder queue table, wherein the multi-reorder queue table is established based on the filter rules from the management module. In step S650, the checker allocates the out-of-order packets of the packets to different reorder queues according to the multi-reorder queue table. In some embodiments of the invention, the packets are classified into three types. In some embodiments of the invention, for one type, the method further comprises that if the packets are in order, the checker directly pushes the packets to its corresponding application through the stack. In some embodiments of the invention, for another two types, the method further comprises that if a first out-of-order packet of the out-of-order packets matches with one filter rule in the multi-reorder queue table, the checker allocates the first out-of-order packet to its corresponding reorder queue of the multi-reorder queue circuit, and if a second out-of-order packet of the out-of-order packets does not match with any filter rule in the multi-reorder queue table, the checker allocates the second out-of-order packet to a normal queue of the multi-reorder queue circuit.

In some embodiments of the invention, the method further comprises that before a reorder timer corresponding to one reorder queue of the multi-reorder queue circuit is not expired, if a bitmap is complete, the multi-reorder queue circuit pushes the packets in the reorder queue to its corresponding application through the TCP/IP stack.

In some embodiments of the invention, the method further comprises that when a reorder timer corresponding to one reorder queue of the multi-reorder queue circuit is expired and a bitmap is not complete, the multi-reorder queue circuit pushes the packets in the reorder queue to the TCP/IP stack.

In some embodiments of the invention, the method further comprises that the multi-reorder queue circuit checks high level sequence numbers of the out-of-order packets, wherein the high level sequence numbers are supported by a higher layer protocol, such as TCP. If the high level sequence numbers of the out-of-order packets are continuous, the multi-reorder queue circuit pushes the out-of-order packets to its corresponding application through the TCP/IP stack.

In the method for managing out-of-order packets provided in the invention, multiple reorder queues and multiple reorder timers are introduced into the PDCP layer of the UE. Therefore, the mechanism in the method for managing out-of-order packets provided in the invention will provide more flexibility for managing or allocating the out-of-order packets of different types of applications.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment (UE) for managing out-of-order packets, comprising:
   a radio frequency (RF) signal processing device, configured to receive a plurality of packets from a network node;
   a management module, configured to collect network information of the network node and application information and generating a plurality of filter rules according to the network information, the application information and default reorder timers, wherein the network information, the application information and the default reorder timers correspond to different weights for the plurality of filter rules;
   a filter module, wherein the filter module receives the filter rules from the management module and allocates a plurality of out-of-order packets of the packets to different reorder queues according to the filter rules, wherein each reorder queue of the different reorder queues corresponds to a different reorder timer; and
   a multi-reorder queue circuit, wherein the multi-reorder queue circuit comprises the reorder queues, wherein the multi-reorder queue circuit determines how to push each out-of-order packet of the plurality of out-of-order packets to its corresponding application through a Transmission Control Protocol/Internet Protocol (TCP/IP) stack, wherein the filter rules comprise expiration value of the reorder timers of the reorder queues.

2. The UE of claim 1, wherein the network information comprises an operator information, a network type, a signal strength, a latency, an out-of-order rate and packet loss rate.

3. The UE of claim 1, wherein the application information comprises types of applications, 5-tuple information of applications, and process Identity (ID) of applications.

4. The UE of claim 1, wherein the management module comprises:
   a recorder, configured to record an application list, types of applications in the application list and default reorder timers corresponding to applications in the application list;
   a collector, configured to collect the network information and the application information, wherein the collector collects the application information corresponding to the applications in the application list; and
   a reorder timer setting module, configured to receive the network information and the application information from the collector, receive the default reorder timers from the recorder, generate the filter rules according to the network information, the application information and the default reorder timers.

5. The UE of claim 4, wherein the reorder timer setting module updates the filter rules according to new network information and new application information collected by the collector.

6. The UE of claim 1, wherein the filter module comprises:
   a storage device, configured to store a multi-reorder queue table, wherein the multi-reorder queue table is established based on the filter rules from the management module; and
   a checker, configured to allocate the out-of-order packets of the packets to different reorder queues according to the multi-reorder queue table.

7. The UE of claim 6, wherein if the packets are in order, the checker directly pushes the packets to its corresponding application through the TCP/IP stack.

8. The UE of claim 7, wherein if a first out-of-order packet of the out-of-order packets matches with one filter rule in the multi-reorder queue table, the checker allocates the first out-of-order packet to its corresponding reorder queue of the multi-reorder queue circuit, and if a second out-of-order packet of the out-of-order packets does not match with any filter rule in the multi-reorder queue table, the checker allocates the second out-of-order packet to a normal queue of the multi-reorder queue circuit.

9. The UE of claim 1, wherein before a reorder timer corresponding to one reorder queue of the multi-reorder queue circuit is not expired, if a bitmap is complete, the multi-reorder queue circuit pushes the packets in the reorder queue to its corresponding application through the TCP/IP stack.

10. The UE of claim 1, wherein when a reorder timer corresponding to one reorder queue of the multi-reorder queue circuit is expired and a bitmap is not complete, the multi-reorder queue circuit pushes the packets in the reorder queue to the TCP/IP stack.

11. The UE of claim 1, wherein the multi-reorder queue circuit checks sequence numbers of the out-of-order packets, wherein the sequence numbers are supported by a higher layer protocol.

12. The UE of claim 11, wherein if the sequence numbers of the out-of-order packets are continuous, the multi-reorder queue circuit pushes the out-of-order packets to its corresponding application through the TCP/IP stack.

13. A method for managing out-of-order packets, applied to a user equipment (UE), comprising:
   receiving, by a radio frequency (RF) signal processing device of the UE, a plurality of packets from a network node;

collecting, by a management module of the UE, network information of the network node and application information;

generating, by the management module, a plurality of filter rules according to the network information, the application information and default reorder timers, wherein the network information, the application information and the default reorder timers correspond to different weights for the plurality of filter rules;

receiving, by a filter module of the UE, the filter rules from the management module;

allocating, by the filter module, a plurality of out-of-order packets of the packets to different reorder queues of a multi-reorder queue circuit of the UE according to the filter rules, wherein each reorder queue of the different reorder queues corresponds to a different reorder timer; and determining, by the multi-reorder queue circuit, how to push each out-of-order packet of the plurality of out-of-order packets to its corresponding application through a Transmission Control Protocol/Internet Protocol (TCP/IP) stack, wherein the filter rules comprise expiration value of the reorder timers of the reorder queues.

14. The method of claim 13, further comprising:

recording, by a recorder of the management module, an application list, types of applications in the application list and default reorder timers corresponding to applications in the application list;

collecting, by a collector of the management module, the network information and the application information, wherein the application information collected by the collector corresponds to the applications in the application list; and receiving, by a reorder timer setting module of the management module, the network information and the application information from the collector and the default reorder timers from the recorder;

generating, by the reorder timer setting module, the filter rules according to the network information, the application information and the default reorder timers.

15. The method of claim 14, further comprising:

updating, by the reorder timer setting module, the filter rules according to new network information and new application information collected by the collector.

16. The method of claim 13, further comprising:

a checker of the filter module, allocating the of out-of-order packets of the packets to different reorder queues according to a multi-reorder queue table, wherein a storage device of the filter module stores the multi-reorder queue table, and the multi-reorder queue table is established based on the filter rules from the management module.

17. The method of claim 16, further comprising:

if the packets are in order, directly pushing, by the checker, the packets to its corresponding application through the TCP/IP stack.

18. The method of claim 17, further comprising:

if a first out-of-order packet of the out-of-order packets matches with one filter rule in the multi-reorder queue table, allocating, by the checker, the first out-of-order packet to its corresponding reorder queue of the multi-reorder queue circuit; and if a second out-of-order packet of the out-of-order packets does not match with any filter rule in the multi-reorder queue table, allocating, by the checker, the second out-of-order packet to a normal queue of the multi-reorder queue circuit.

19. The method of claim 13, further comprising:

before a reorder timer corresponding to one reorder queue of the multi-reorder queue circuit is not expired, if a bitmap is complete, pushing, by the multi-reorder queue circuit, the packets in the reorder queue to its corresponding application through the TCP/IP stack.

20. The method of claim 13, further comprising:

when a reorder timer corresponding to one reorder queue of the multi-reorder queue circuit is expired and a bitmap is not complete, pushing, by the multi-reorder queue circuit, the packets in the reorder queue to the TCP/IP stack.

* * * * *